Patented Jan. 7, 1947

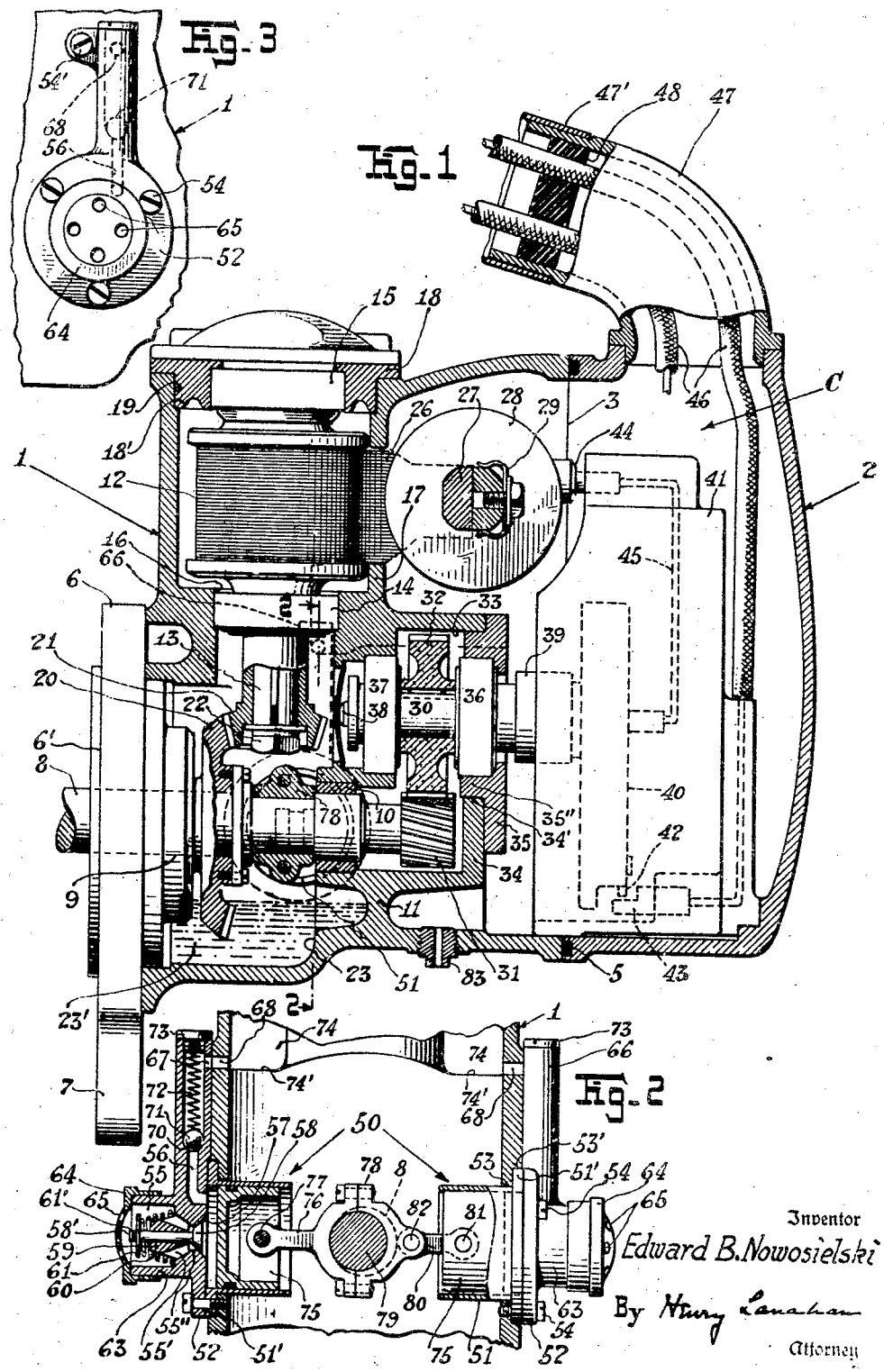

2,413,993

UNITED STATES PATENT OFFICE 2,413,993

SUPERCHARGED MAGNETO

Edward B. Nowosielski, Bloomfield, N. J., assignor to Edison-Splitdorf Corporation, West Orange, N. J., a corporation of New Jersey Application September 17, 1941, Serial No. 411,125

3 Claims. (Cl. 171—209)

1

This invention relates to ignition apparatus and, more particularly, to ignition apparatus for aircraft which are to fly at high altitudes.

Because of the decreasing dielectric strength of the air at the higher altitudes it is necessary that special measures be taken to prevent corona discharge or flashover between the parts of the aircraft ignition equipment which are at widely different potentials, particularly those parts which are exposed and have a substantially direct air conduction path therebetween such as the terminals of a magneto distributor. As corona discharge reduces the efficiency of the equipment and results in corrosion of parts and deterioration of insulation, and as flashover results in immediate complete failure of the equipment, it is necessary to avoid completely both of these effects. This has been done by supercharging the ignition apparatus—that is, by building up the internal pressure above that of the outside atmosphere so as to maintain at the higher altitudes the internal pressure substantially equal to that of the atmosphere at sea level.

It is an object of my invention to provide a supercharged ignition apparatus of practical design and construction, and more particularly to provide an improved arrangement of the components of such apparatus.

It is another object to provide an improved and supercharged magneto for aircraft wherein the parts are so arranged as to produce a simplification in structure and a more efficient and dependable operation while enabling an easy assembling and servicing of parts.

It is a further object to provide a new and advantageous mechanical relationship between the supercharging and ignition-equipment parts.

My improved arrangement includes an oil or drive-transmission chamber as a part of the enclosing casing of the ignition apparatus or magneto, which is separate from the chamber to be supercharged and into which I partially house the supercharging means. More particularly, my invention contemplates a common oil chamber for the supercharging means and such other variable ratio drive transmissions as the equipment may employ. In this connection, it will be seen that the magneto arrangement which I have disclosed in my copending application Serial No. 375,996, filed January 25, 1941, and entitled "Magneto construction" is peculiarly adapted to be supercharged in an efficient and practical manner as in accordance with the objects of my invention; and it is with such magneto arrangement that I herein illustrate and describe my invention, but without intending any unnecessary limitation thereto.

Other objects and features of my invention will more fully appear from the following description and the appended claims.

2

In the description of my invention, reference is had to the accompanying drawing, of which:

Figure 1 is a vertical section of a magneto to which my invention is applied;

Figure 2 is a fragmentary vertical view principally in section on the line 2—2 of Figure 1; and Figure 3 is a fragmentary side elevational view of the magneto.

The magneto arrangement shown in the accompanying figures and to which my invention is applied includes a casing which comprises a main section 1 and a minor section or end cap 2 made of a suitable light material such as aluminum. These housing sections meet at a vertical plane, on the line 3, and are held together by clamping screws not shown. The joint in the housing is rendered fluid-tight by means of a gasket 5 clamped between the sections thereof. At the drive end of the magneto—that is the left end thereof as it appears in Figure 1—there is secured a mounting plate 6 having extensions 7. These extensions serve as a means for fastening the magneto to a suitable support such as an engine block, the outer surface of the plate being machined to provide a mounting face 6' to fit the cooperating face of the support. Extending centrally through the mounting plate 6 is a drive shaft 8 for the magneto, which is to have a drive connection with the engine.

The drive shaft 8 extends partially through the magneto casing and is journalled thereto in two bearings: a bearing 9 near the outer end of the shaft in the mounting plate 6 and a bearing 10 near the inner end of the shaft in a vertical partitioning wall 11 of the housing section 1.

Supported in an axially vertical position at the drive end of the magneto is a rotor 12 having a shaft 13 journalled in lower and upper bearings 14 and 15. The lower bearing 14 seats in a shouldered opening 16 provided in a horizontal extension 17 of the partitioning wall 11. The upper bearing 15 is carried by a removable cap 18 on the top of the housing section 1. This cap is located by the engagement of an annular flange 18' on the cap with an opening 19 in the housing section through which the rotor is passed in the assembling or disassembling of the magneto.

It is a feature of the present magneto arrangement herein shown that the rotor have a restricted number of poles and be driven at such increased speed as to produce the requisite number of ignition sparks per engine revolution. To this end, I drive the rotor from the shaft 8 through stepped-up bevel gearing comprising a gear 20 which is keyed to the shaft 8 between the bearings 9 and 10, and a cooperating gear 21 which is secured to the lower end of the rotor shaft by a screw stud and lock washer arrangement 22. The gears 20 and 21 are housed in an oil chamber 23 formed in the housing section 1 by the partitioning walls 11 and 17 and by the mounting plate 6 at the drive end of the magneto and containing a pool of oil 23' into which the gear 20 is partially immersed.

The rotor 12 is interposed between two field pole pieces, one of which appears as 26 in Figure 1. The pole pieces are mounted at opposite sides of the housing section 1 and extend rearwardly in a horizontal plane from the drive end of the magneto. At their rearward ends, in a main chamber C of the magneto casing, they are bridged by a core 27 on which there is provided an ignition coil 28 having both low and high tension (primary and secondary) windings. Attachment of the core to the pole pieces is effected in any satisfactory manner as by screws and spring lock washers generally referred to as 29.

The circuit breaker and distributor for the magneto are both operated from a shaft 30 which is parallel to the drive shaft 8 but offset vertically therefrom. This shaft 30 is driven from the inner end of the drive shaft through spiral gears 31 and 32. These gears are housed in a gear box 33 suitably formed by a hollow extension 34 of the partitioning wall 11 and a plate 35 secured to the end of this extension. In the plate 35 and in the wall of the gear box opposite thereto there are provided bearings 36 and 37 for the shaft 30. To locate the bearing 36 accurately, the plate 35 is provided with an interior hub 35'' which fits a circular opening 34' in the end wall of the extension 34. The end of the shaft 30 at the bearing 37 may have a ground connection 38 with the casing so as to prevent a flow of current through the bearings 36 and 37.

On the outer end portion of the shaft 30 in the chamber C there is provided a circuit breaker cam 39. This cam is adapted to operate a suitable circuit breaker (not shown) to interrupt the current in the primary winding of the coil 28.

The distributor for the magneto is housed also in the chamber C and comprises an arm 40 secured to the end of the shaft 30 and a stationary block 41 carried by the housing section 2, each of which may comprise moldings of an insulating material into which are embedded suitable current-carrying elements. The arm 40 has a conducting segment terminating in a terminal 42, and the block has a series of terminals 43, one of which is shown in Figure 1, which are circularly arranged adjacent the path described by the terminal 42 in the rotation of the arm. The conducting segment 42 has a direct connection with a high tension terminal 44 on the coil 28, which is made through the block by way of a conducting means 45 as is indicated in Figure 1. It will be understood that the high tension terminal 44 is connected within the coil 28 to one side of the secondary winding of the coil and that the other side of this winding is grounded to the frame of the machine. Thus high tension current is conducted from the coil to the distributor arm, from whence it jumps successively to the terminals 43 of the distributor block as the arm rotates. The current from the distributor terminals is conducted to the engine spark plugs by way of insulated conductors 46, two of which are shown in Figure 1. These leads pass through a conduit 47 at the top of the housing. A fitting 47' is provided for making connection of the conduit to a metallic tubing or harness (not shown) through which the conductors are led to the engine spark plugs.

For purposes of illustration the rotor 12 may be considered as being of a two-pole type. As such a rotor is capable of generating but two ignition sparks per revolution thereof, it is necessary that it be driven above engine speed in order to be able to serve a four-cycle engine of more than four cylinders. To serve, for example, a nine-cylinder engine, the rotor would have to generate 4½ ignition sparks per engine revolution and would accordingly have to be driven 2¼ times engine speed—which is the transmission ratio of the gears 20 and 21 coupling the rotor to the drive shaft 8. By using a rotor having a restricted number of poles and then driving it above engine speed to produce the requisite number of ignition sparks per engine revolution, I obtain a highly efficient magneto of small size and weight as is pointed out in my copending application abovementioned.

The means which I provide to supercharge the magneto—or more particularly the chamber C—comprises a pair of pumps 50 which are included in—that is, at least partially disposed within—the oil chamber 23 at opposite sides of the drive shaft 8. These pumps—which are of the reciprocatory intermittent-action type—each comprise a cylinder 51 and a cast cylinder head 52. The cylinders 51 project into the oil chamber 23 through openings 53 provided in the side walls of the chamber, and have flanged ends 51' which fit annular recesses 53' provided in these side walls about the openings. The cylinder heads 52 are clamped to the magneto casing against the cylinder flanged ends by screws 54. To form an airtight seal between the heads and casing, their contiguous surfaces are machined and, if desired, a suitable sealing material or gasket (not shown) may be interposed therebetween.

In the cylinder heads 52 there are provided inlet and outlet ports 55 and 56 for the respective cylinders 51. Each inlet port comprises a group of ducts 55' which merge into an inner conical opening 55'' adapted to provide a valve seat 57. Fitting this valve seat is a valve 58 of the bevelled disk form which has a stem 58' guided in an apertured boss 59 provided on the cylinder head centrally of the ducts 55'. This valve is biased outwardly into closed position by a compression spring 60 interposed between the cylinder head and a collar 61 which is secured to the outer end of the valve stem by a pin 61'. Surrounding the ducts 55' and exterior valve parts is a tubular element 63 which is cast integrally with the cylinder head, and press fitted onto this tubular element is a cap 64 having apertures 65 therein to form a screen or filter over the inlet port; this is for the purpose of preventing the inflow of dirt or other foreign matter into the pumps. Of course any other or additional filtering means may be here employed.

Each outlet port abovementioned leads from the cylinder 51 through an upward extension 66 of the cylinder head. This extension is clamped tightly against the magneto casing by a clamping screw 54'. Near the outer end of the extension in the side thereof adjacent the casing, there is an opening 67 which leads from the port 56 and registers with an opening 68 in the magneto casing. This opening 68 communicates with the chamber C, there being pockets 74 in the chamber at the opposite sides of the gear box 33 where the openings 68 are located, which pockets are formed by lowered side extensions of the partition 17 the top surfaces of which are designed as 74' in Figures 1 and 2. Each outlet port 56 has an inner reduced-diameter portion adapted to form an annular valve seat 70. Fitting this valve seat is a valve comprising a ball 71 which is biased inwardly into closed position by a compression spring 72 interposed between the ball and a plug 73 threaded into the outer end of the port.

The cylinders 51 have pistons 75 fitted therein which are driven from the shaft 8. The drive connections of these pistons to the shaft may, for example, comprise a connecting rod 76 pivoted at 77 to one of the pistons and having a bearing 78 secured thereto and embracing an eccentric 79 on the shaft 8 as between the bearing 10 and bevel gear 20, and a connecting rod 80 pivoted at 81 to the other of the pistons and at 82 to the bearing 78. As so arranged, the pistons 75 will be reciprocated upon rotation of the shaft 8, one receiving its in-stroke as the other receives its out-stroke, and vice versa. During the out-stroke of each piston, the respective valve at the inlet port will open and air will flow into the cylinder, and then during the in-stroke this air within the cylinder is forced out through the outlet port into the chamber C. As these pumps are 180° out of phase, they will produce a pressure exhaust during each half revolution of the shaft 8 to provide a substantially even source of supercharging pressure to the chamber C.

The magneto chamber C is made substantially air tight and, to this end, a rubber grommet 48 is fitted into the conduit 47 as is shown. However, in order that there may be a definite escape from the magneto chamber C of the deleterious gases formed therein incident to the magneto operation, I provide the chamber C with a restricted outlet port. This port may for example, comprise a vent plug 83 threaded into the magneto casing at the bottom thereof as is shown in Figure 1.

The placing of the supercharging pumps in an oil chamber isolated from the main or distributor chamber to be supercharged, provides a practical and efficient arrangement of a supercharged magneto which offers special advantages in operation and construction, in the ease of lubricating the parts and in permitting easy mounting of the pumps and removal thereof as for their servicing or repair. In the present instance, I place the pumps in an oil chamber already provided in the magneto structure for housing a variable ratio transmission of the magneto proper—the transmission for driving the rotor 12 from the shaft 8. This community in arrangement of parts enables a simplification in the overall structure of the magneto. Furthermore, it has the special functional advantage of enabling the pumps to be lubricated by circulation of oil produced by the drive transmission of the magneto proper. In the illustrative embodiment, this function is attained by the ear 20, which being partially immersed in the pool of oil 23', will transmit or spray the oil throughout the chamber 23 and over the parts of the pumps to be lubricated. Were it not for this action of the gear 20, special means would have to be provided to lubricate the pumps as the pumps can not practically be immersed in the oil.

As a further advantage incident to the present magneto arrangement, it is pointed out that in housing the drive transmissions of the magneto in an interior oil chamber separate from the chamber to be supercharged, the supercharged pressure in the latter chamber acts to prevent leakage of oil through bearings which must be provided in the partitioning walls between these chambers.

It will be seen from the foregoing disclosure that I have provided a practical arrangement of supercharged ignition equipment adapted for dependable and efficient service for aircraft. It will be further understood that the particular embodiment herein shown is illustrative and not limitative of my invention, as these embodiments are subject to many changes and modifications without departure from the scope of my invention which I endeavor to express according to the following claims.

I claim:

1. An ignition apparatus adapted for use in the rarefied atmosphere comprising an enclosing casing having an oil chamber and a main chamber, said main chamber including an operative component to be supercharged; a drive shaft for said ignition apparatus journalled to said casing and extending into said oil chamber, said oil chamber having an aperture in the wall thereof and said main chamber having an inlet port; a pressure pump removably mounted in said aperture and coupled to said drive shaft within said oil chamber; and a rigid outlet conduit on said pump and fixedly connected thereto, said conduit being adapted to register with said inlet port, to convey air under pressure from said pump into said main chamber, when said pump is in mounted position.

2. In a magneto including an enclosing casing, a rotor, a drive shaft adapted for connection to an engine, a main chamber and an operative component in said main chamber adapted to work under a supercharged pressure: the combination of an oil chamber in said casing into which said shaft extends, said chamber extending the full distance between opposite exterior walls of said casing in directions radial to said shaft, said exterior walls having apertures therein at opposite sides of said shaft; a pair of reciprocating pumps mounted in said apertures and drivingly connected to said shaft; gearing in said oil chamber coupling said rotor to said drive shaft, said gearing functioning to distribute oil within said chamber to lubricate said pumps; and means for transferring air under pressure from said pumps into said main chamber to supercharge said operative component.

3. In a magneto including a shaft adapted for connection to an engine and a rotor adapted to be driven by said shaft; the combination of an enclasing casing including an oil chamber and a second chamber, said oil chamber being sealed from said second chamber and said second chamber having inlet and outlet ports to the outside and including an operative component of the magneto adapted to operate under supercharged pressure; gearing in said oil chamber coupling said rotor to said shaft; a pump mounted on said casing and having a drive connection to said shaft in said oil chamber; and means for transferring air under pressure exteriorly of said casing from said pump to said inlet port of said second chamber.

EDWARD B. NOWOSIELSKI.